(12) United States Patent
Revirand et al.

(10) Patent No.: US 8,122,921 B2
(45) Date of Patent: Feb. 28, 2012

(54) DEVICE FOR DISTRIBUTION OF AT LEAST ONE GRANULAR PRODUCT IN A CONTAINER FILLING DEVICE AND METHOD FOR FILLING USING SUCH A DEVICE

(75) Inventors: Pascal Revirand, Saint Egreve (FR); Luc Federzoni, Bourgoin-Jallieu (FR)

(73) Assignee: Commissariat a l'Energie Atomique, Paris (FR)

( * ) Notice: Subject to any disclaimer, the term of this patent is extended or adjusted under 35 U.S.C. 154(b) by 1149 days.

(21) Appl. No.: 11/816,123

(22) PCT Filed: Feb. 10, 2006

(86) PCT No.: PCT/FR2006/050119
§ 371 (c)(1),
(2), (4) Date: Aug. 13, 2007

(87) PCT Pub. No.: WO2006/085035
PCT Pub. Date: Aug. 17, 2006

(65) Prior Publication Data
US 2008/0264517 A1    Oct. 30, 2008

(30) Foreign Application Priority Data
Feb. 14, 2005    (FR) ...................................... 05 50418

(51) Int. Cl.
*B65B 1/04*    (2006.01)
(52) U.S. Cl. .............................. 141/286; 141/11; 141/71
(58) Field of Classification Search ................ 141/5, 11, 141/71–72, 285–286
See application file for complete search history.

(56) References Cited

U.S. PATENT DOCUMENTS

| 3,868,028 | A | * | 2/1975 | Mausser | ....................... 414/299 |
| 4,081,004 | A | | 3/1978 | Harris | |
| 4,257,710 | A | | 3/1981 | Delcoigne et al. | |
| 4,306,829 | A | | 12/1981 | Loutaty et al. | |
| 4,318,511 | A | | 3/1982 | Clark | |
| 4,424,837 | A | * | 1/1984 | Farrell | ......................... 141/286 |
| 4,433,707 | A | * | 2/1984 | Farnham | .......................... 141/1 |

(Continued)

FOREIGN PATENT DOCUMENTS

BE    899 420 A2    7/1984
(Continued)

OTHER PUBLICATIONS

U.S. Appl. No. 12/600,061, filed Nov. 13, 2009, Revirand, et al.

*Primary Examiner* — Gregory Huson
*Assistant Examiner* — Nicolas A Arnett
(74) *Attorney, Agent, or Firm* — Oblon, Spivak, McClelland, Maier & Neustadt, L.L.P.

(57) ABSTRACT

A device for distributing granular materials in a recipient, particularly of complex shape intended to be arranged between a feed hopper and the recipient to be filled. The device includes a deflector, mobile in rotation around an axis, lining a passage linking the hopper to the recipient. The deflector is formed by at least one surface that may be inclined in relation to the axis of rotation approaching the axis in the direction of flow of the granules, or perpendicular to the axis. According to the speed of rotation, a certain quantity of granules is ejected by the deflector and another part passes directly in the passage.

25 Claims, 6 Drawing Sheets

U.S. PATENT DOCUMENTS

| | | | | |
|---|---|---|---|---|
| 4,437,613 A | * | 3/1984 | Olson | 239/688 |
| 4,972,884 A | * | 11/1990 | Souers et al. | 141/286 |
| 5,244,129 A | * | 9/1993 | Poussin et al. | 222/410 |
| 5,280,813 A | * | 1/1994 | Jackson | 141/286 |
| 5,348,434 A | * | 9/1994 | Peeples et al. | 414/301 |
| 5,393,189 A | | 2/1995 | Berquist | |
| 5,421,379 A | * | 6/1995 | Geiser | 141/286 |
| 5,687,780 A | | 11/1997 | Minami | |
| 5,735,319 A | * | 4/1998 | McNamara et al. | 141/286 |
| 5,758,699 A | * | 6/1998 | Haquet et al. | 141/286 |
| 5,906,229 A | * | 5/1999 | Haquet et al. | 141/286 |
| 5,931,205 A | * | 8/1999 | Jasica et al. | 141/286 |
| 5,950,694 A | * | 9/1999 | Jama et al. | 141/286 |
| 6,176,276 B1 | * | 1/2001 | Maunder et al. | 141/286 |
| 6,315,011 B1 | | 11/2001 | Smith | |
| 2003/0113222 A1 | | 6/2003 | Skoglund et al. | |
| 2007/0071632 A1 | | 3/2007 | Revol | |

FOREIGN PATENT DOCUMENTS

| | | |
|---|---|---|
| DE | 29 24 313 | 12/1980 |
| DE | 33 10 725 A1 | 9/1984 |
| EP | 0 032 481 A2 | 7/1981 |
| EP | 0 155 736 A1 | 9/1985 |
| EP | 0 352 981 A1 | 1/1990 |
| EP | 1 145 614 A1 | 10/2001 |
| FR | 2 234 045 | 1/1975 |
| FR | 2 431 449 | 2/1980 |
| FR | 2 582 955 | 12/1986 |
| FR | 2 271 900 | 1/1996 |
| FR | 2 740 123 | 4/1997 |
| JP | 58-006844 | 1/1983 |
| JP | 62-122902 | 6/1987 |
| JP | 7-125702 | 5/1995 |
| WO | WO 2006/079740 A1 | 8/2006 |

* cited by examiner

DEVICE FOR DISTRIBUTION OF AT LEAST ONE GRANULAR PRODUCT IN A CONTAINER FILLING DEVICE AND METHOD FOR FILLING USING SUCH A DEVICE

TECHNICAL FIELD AND PRIOR ART

The present invention relates to a device for distributing at least one granular material in a recipient, a filling device and a filling method using such a device.

The filling of recipients by granular materials is normally carried out by a pipe of circular section connected by an upper end to a reservoir of granular material. However, the granular type materials may have a poor flowability due to the fact of their particle size, their intrinsic roughness and/or their density. This type of filling is then not satisfactory to assure a uniform filling of the mould, especially in the case of moulds with complex geometry.

It has been proposed to improve the flowability of materials by fluidisation of said materials, for example by means of an air flow. However the means to be implemented are complex.

In the document FR 2 431 449, a device has been proposed for distributing materials in granular form, comprising a shaft driven in rotation around its axis and arranged below a feed hopper, equipped at its end opposite to the hopper with rubber strips suited to sloping in relation to the axis of the shaft, when said shaft is driven in rotation. These strips form deflectors that, depending on the speed of rotation of the shaft, divert more or less granules from their vertical trajectory. Thus, the granules are spread out in a uniform manner in the recipient. However, the filling obtained by this device is still imperfect, since firstly, there is a lack of material in the recipient vertical to the shaft, and secondly the filling is not uniform for recipients of complex shape. Indeed, this device is relatively efficient for recipients in the shape of a regular cylinder, however it is a lot less so for recipients comprising corners, such as parallelepipedal recipients.

Consequently, it is an aim of the present invention to offer a filling device and a filling method enabling a uniform filling of any type of recipient, in particular recipients comprising corners.

DISCLOSURE OF THE INVENTION

This aim is attained by a filling device equipped with deflector means formed by at least one deflection surface lining a channel. The deflection surface deflects a part of the granular material towards the outside so as to fill the more outer parts of the recipient and the channel fills the more inner parts of the recipient.

Thanks to the present invention, a better distribution of the material in the not very accessible parts of the recipient, in particular the corners, is obtained.

The principal subject of the present invention is then a device for distributing at least one granular material, comprising means for deflecting a part of the material, said deflector means being mobile in rotation around an axis, characterised in that the deflector means are formed by at least one deflection surface lining at least one passage, so that part of the non diverted material takes the passage.

In a specific embodiment, the deflection surface is perpendicular to the axis of rotation.

In another specific embodiment, the deflection surface is inclined in direction of the axis of rotation in a general direction of flow of the material.

In particular, the distribution device is intended to be interposed between a feed source of said granular material and a recipient to be filled.

Moreover, the part of material diverted and the part of material taking the passage depend on the speed of rotation of the deflector means.

Advantageously, the deflector means surround in a continuous manner the end of the entrance of said passage.

In a first embodiment, the deflection surface is a cone, the generatrixes of which are straight lines.

In a second embodiment, the deflection surface is concave.

In a third embodiment, the deflection surface is convex.

Advantageously, one may provide that the section of the surface along a plane orthogonal to the axis of rotation is a circle, an ellipse, or a substantially rectangular shape.

Moreover, it is conceivable that the passage has for example the shape of a regular cylinder, a cone oriented towards the deflector means or an ellipsoidal guiding cylinder.

In a specific embodiment, the distribution device comprises a central shaft coaxial to the axis of rotation connected to the deflector means by at least one arm, or by at least one blade. The blade may be inclined in relation to the axis of rotation or contained in a plane containing the axis of rotation.

Advantageously, the deflection surface comprises apertures, placing in communication an inner space delimited by the surface with an outer environment. In a preferred manner, said apertures are substantially parallel to the axis of rotation and distributed in a regular manner angularly around the axis of rotation. According to a first embodiment, the apertures extend over the whole height of the distribution device along the axis of rotation. According to a second embodiment, the apertures extend over a part only of the height of the device.

A further subject of the present invention is a device for filling recipients by at least one granular material comprising a feed hopper and a distribution device according to the present invention, the distribution device being interposed between the feed hopper and a recipient to be filled.

A yet further subject of the present invention is a method of filling a recipient by a granular material with a filling device according to the present invention, comprising the steps:
putting in place the distribution device and the hopper opposite the opening of the recipient;
bringing into rotation the deflector means according to a speed;
feeding at least one granular material by opening of the hopper.

One may provide that during the filling, the speed of rotation is variable according to a predetermined sequence.

Finally, as a variant, the distribution device is arranged inside the recipient.

BRIEF DESCRIPTION OF DRAWINGS

The present invention will be better understood with the help of the following description and the appended drawings, wherein.

DETAILED DESCRIPTION OF SPECIFIC EMBODIMENTS

Figure 1A:
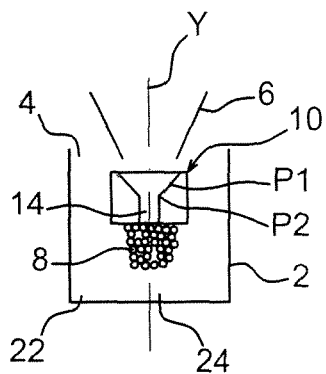
FIGS. 1a to 3b are schematic representations of three types of fillings obtained with the device according to the present invention.

In the present description granular type materials are taken to mean any materials formed from an assembly of separate elements of uniform or variable sizes, for example between several nanometers and several centimeters. Materials in powder are of course covered by this expression.

In FIGS. 1a to 3b, one may see a recipient 2, of parallelepipedal shape, comprising an opening 4 in its upper part, a hopper 6 for feeding granular material 8 arranged above said recipient and lined up with the opening 4. A distribution device 10 according to the present invention is interposed between the hopper 6 and the recipient 2, so as to receive by an upper end 12, the granular material from the hopper 6 and to distribute said material in the recipient 2 through the opening 4.

In the example shown, the device 10 is arranged inside the recipient, but it is understood that it may be arranged above the recipient.

The hopper 6 is, for example connected to one or several reservoirs (not shown) of granular materials.

Advantageously, the distribution device 10 moves with the hopper 6.

The device 10 comprises a body 11, equipped with a passage 14 extending substantially along axis Y, from the upper end 12 to a lower end 16, enabling the flow of granules from the hopper towards the recipient through the inside of the device 10.

The device further comprises deflector means 18 arranged upstream of the passage 14 so as to edge the entrance of the passage 14. The deflector means 18 are intended to be driven in rotation around the Y axis according to speed ω, capable of varying over time.

The deflectors are formed by at least one deflection surface 20 inclined in relation to the Y axis so that it approaches the Y axis in the direction of flow of the granules. The surface is formed advantageously inside the device.

In other words, by considering a first point P1 and a second point P2 of said surface, the first point P1 arranged closest to the hopper 6, is located further away from the Y axis than the second point P2 arranged further from the hopper 6.

Advantageously, said surface surrounds in a continuous manner the Y axis.

It is understood that the deflector means 18 may be composed of several discontinuous surfaces 20 joined together.

Thus, depending on the speed of rotation ω of the deflector means 18, a more or less important proportion of the granules is expulsed towards the outside of the distribution device, striking the walls of the recipient and filling the most outer parts 22 of the recipient and the remainder of the granules flows through the passage 14 surrounded by the deflector means 18, then filling a central part 24 of the recipient 2, arranged in line with the passage 14. Thus the granules not diverted by the deflector means, are guided by the deflection surface 20 of the deflector means 18 in direction of the passage 14. The surface 20 then fulfils at the same time the function of deflector and guide.

Figure 1B:
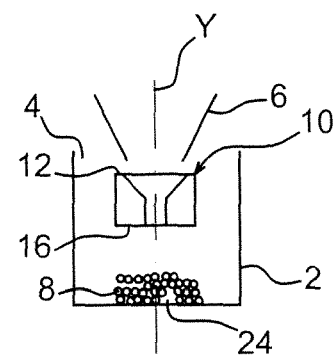

For a speed less than 500 rpm, for example 250 rpm, all the granules take the passage 14 and fall at the centre 24 of the base of the recipient (FIGS. 1a and 1b).

Figure 2A:
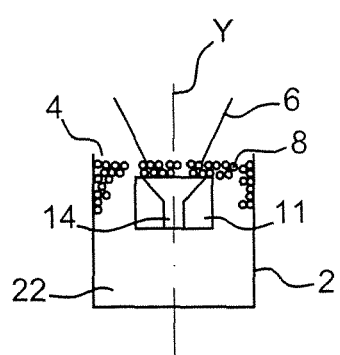
Figure 2B:
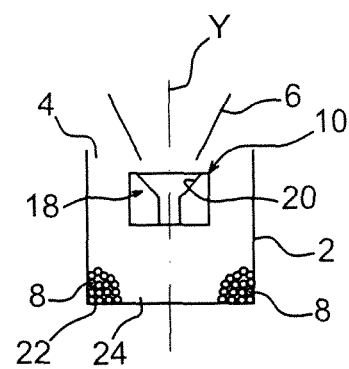

For a speed ω greater than 1000 rpm, for example 2500 rpm, all the granules are diverted by the deflectors 18 and fall on the parts 22 arranged along the walls (FIGS. 2a and 2b).

Figure 3A:
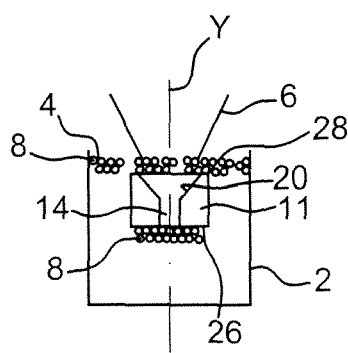
Figure 3B:
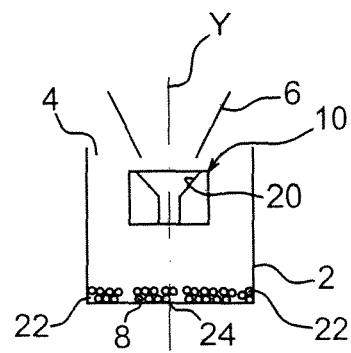

For an intermediate speed ω, for example 600 to 800 rpm, a part 26 of the granules passes through the passage 14 and another part 28 is diverted. The filling is then uniform (FIGS. 3a and 3b).

Thanks to the present invention, the filling is possible with all types of granular materials, whatever their particle size, their density and their flowability.

It is understood that the deflector means 18 and the body 11 may be integral in rotation. Thus the entire device turns around the Y axis. Advantageously, the body 11 and the deflector means 18 are formed in a single piece.

In FIGS. 4 to 13, one may see different examples of deflector means.

Figure 4:
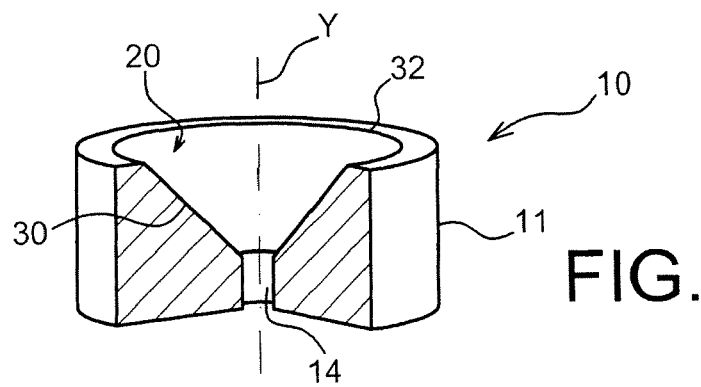
FIGS. 4 to 15 are embodiment examples of a device according to the present invention.

In FIG. 4, the body 11 has the shape of a regular cylinder in which is formed a passage 14 in the shape of a regular cylinder of axis Y and a surface 20 of conical shape, of conicity oriented downwards, the generatrixes of the cone being straight lines 30 and the base 32, a regular circle.

Figure 5:
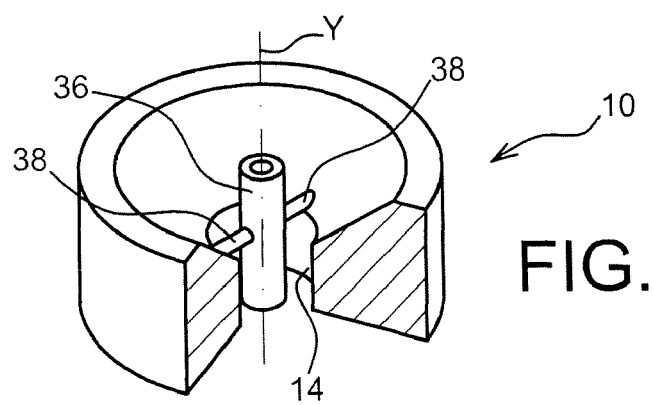

In FIG. 5, the surface 20 is the same as that of FIG. 1, however, the device comprises a shaft 36 of axis Y intended to drive the device in rotation and connected to the body 20 by two diametrically opposite arms 38.

Figure 6:
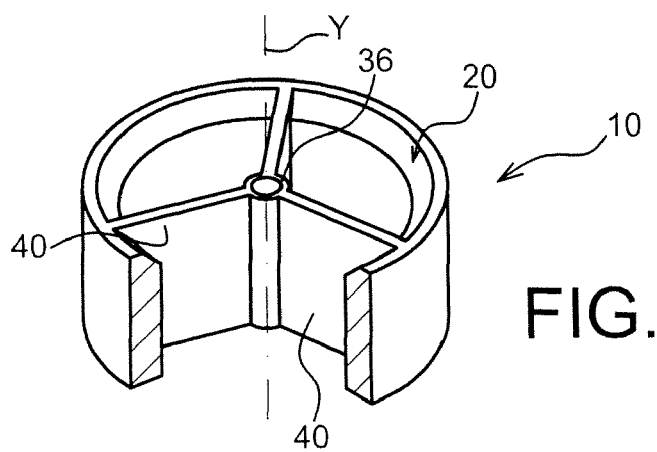

In the example of FIG. 6, the arms 38 have been replaced by three blades 40 extending radially from the shaft 36 and contained in planes containing the Y axis.

Of course, it is understood that a device comprising one arm or more than two arms does not fall outside the scope of the present invention. The same holds for a device comprising one blade, two blades or more than three blades. Moreover, the blades may be inclined in relation to the Y axis, be flat or curved.

Figure 7:
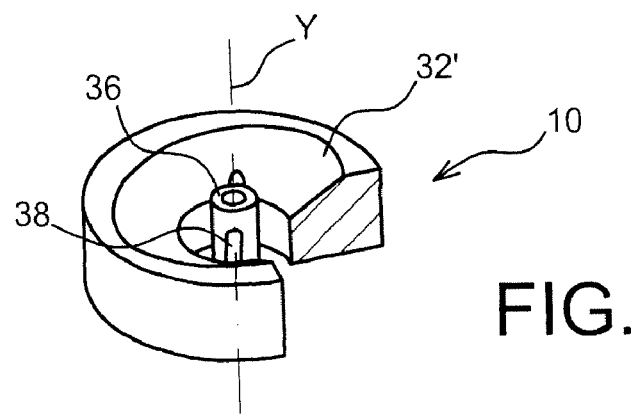

In FIG. 7, the surface is also conical however the base 32' is ellipsoidal.

Figure 8:
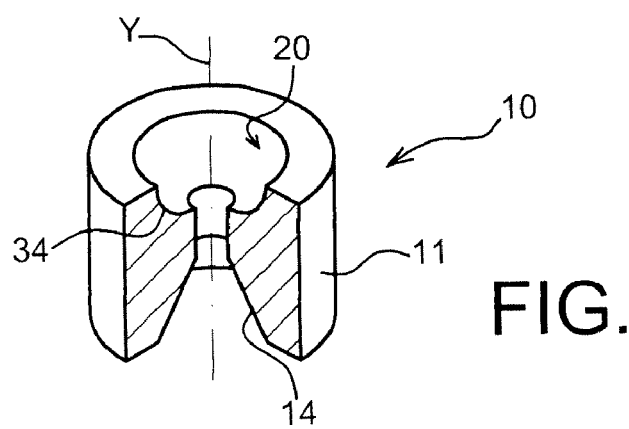

In FIG. 8, the body 11 also has the shape of a regular cylinder. The surface 20 is of conical shape, of conicity oriented downwards, the generatrixes of the cone being concave curves 34 defining a bowl. In this example, the passage 14 is of conical shape oriented upwards.

Figure 9:
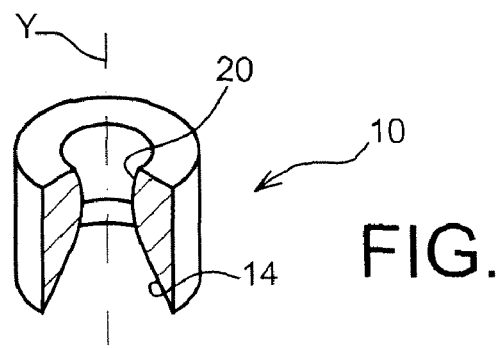

In FIG. 9, the surface 20 is convex and connects to a passage 14 that is also of conical shape oriented upwards.

Figure 10:
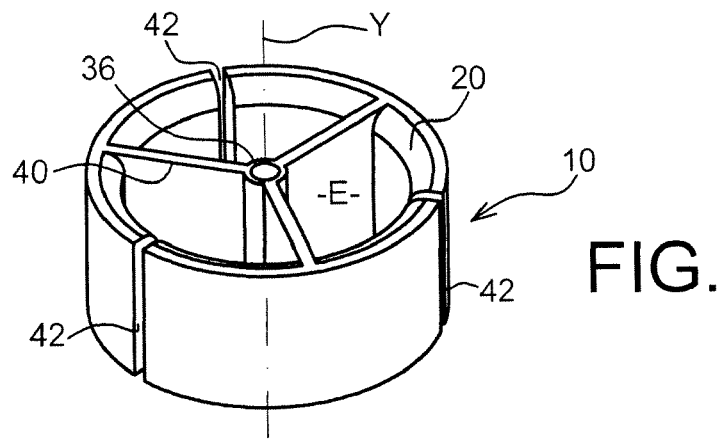
Figure 11:
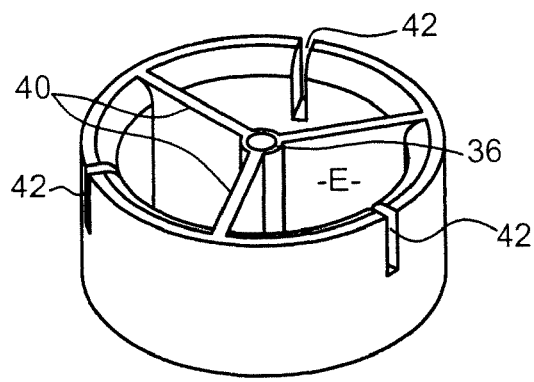

In FIGS. 10 and 11, the surface 20 is also convex. The device 10 further comprises apertures 42 extending along axes parallel to the Y axis and placing in communication a space E defined by the surface 20 inside the body 11 and an outer environment. The apertures 42 improve the flow of the granular material 8.

According to a first embodiment shown in FIG. 10, the apertures 42 extend over the whole height of the distribution device.

According to a second embodiment, the apertures 42 extend partially along the body 11, around up to half the height of the body.

In the examples shown, the apertures are three in number regularly spread out around the Y axis, but it is understood that their number may be less than or more than three.

Figure 12A:
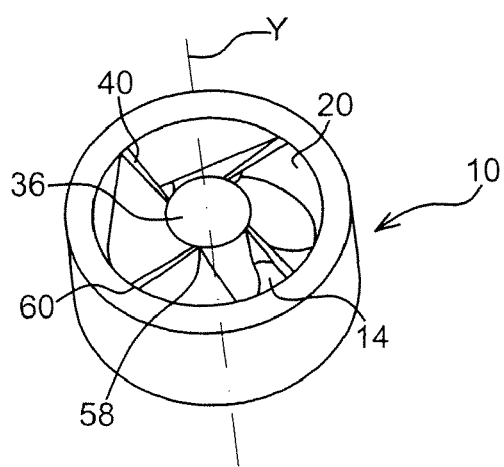
Figure 12B:
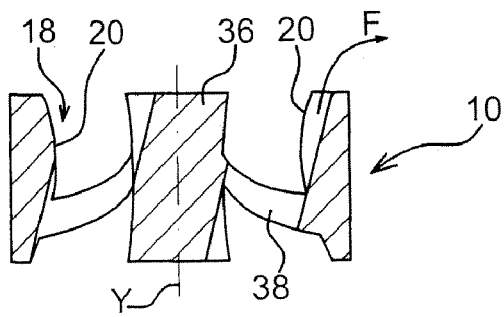

In FIGS. 12a and 12b, the device comprises deflector means 18 of convex shape, a central shaft 36 connected to the body 11 by blades 40 in relation to the Y axis. In the example shown, the blades 40 comprise an inner side 58 connected to the shaft 36 and an outer side 60 connected to the deflector means 18, inclined in relation to the Y axis. In the example shown, the sides have respectively different inclination angles. In FIG. 12b, the trajectory of a granule is shown by the arrow F after its deflection against the surface 20.

Figure 13:
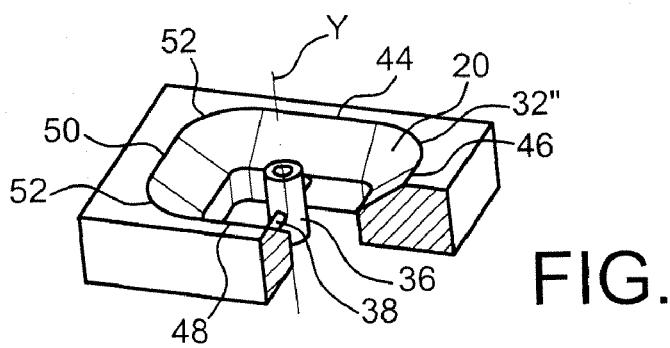

In FIG. 13, the device comprises a conical surface 20, of base 32" substantially of rectangular shape, the sides 44, 46, 48, 50 of the rectangle are connected by arcs of circles 52 so that the surface 20 is continuous. The device further comprises a shaft 36 connected to the body 11 by diametrically opposed arms 38. The body 11 also has a substantially rectangular shape.

Advantageously, the passage 14 has a section along a plane orthogonal to the Y axis (known as section of the passage) corresponding to the section of the surface along a plane orthogonal to the Y axis (known as section of the surface). Thus, if the section of the surface 20 is a circle, the passage is advantageously formed by a regular cylinder; if the section of the surface 20 is an ellipse, the passage 14 is then in a preferred manner a guiding cylinder, an ellipse, etc. However, it is understood that one may have, for example, a surface of circular section and a passage of elliptical or rectangular section, other combinations of course being conceivable.

Figure 14:
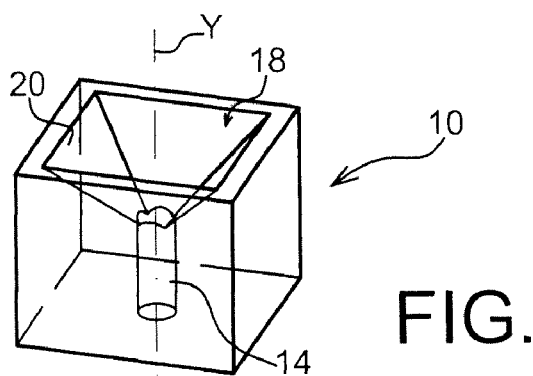

In addition, the surface is not obligatory continuous and may be formed by an assembly of several flat surfaces, so as for example to form an upturned pyramid (FIG. 14).

Figure 15:
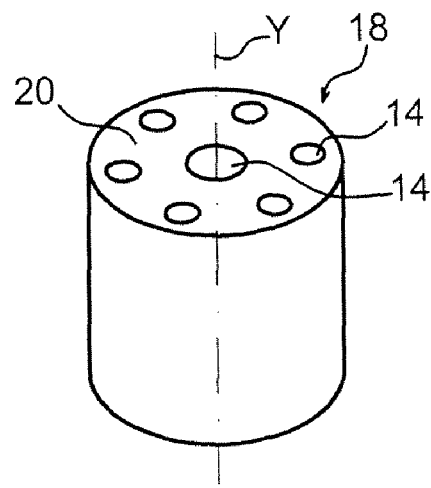

In FIG. 15, one may see another embodiment of a distribution device according to the present invention, formed by a cylinder and comprising on its upper part a surface 20 forming deflector, the surface being contained in a plane orthogonal to the Y axis of rotation. The device further comprises several passages 14, for example seven in the example shown, a central passage 14 and six passages 14 arranged regularly around the central passage according to a circle. In this example, the deflection surface is perpendicular to the direction of flow of the granular material. The operation is similar to that already described for the other embodiment examples.

The devices according to the present invention are for example for automobile mechanical parts of diameter between 50 mm and 100 mm and a height of 100 mm, and for the agri-foodstuffs industry, a diameter of 1 m and a height of 1 m.

The device according to the invention has the advantage of improving the flow of granular materials and also accelerating the rate of filling of the recipients. Indeed, the rotation of the deflector means 18 creates a vortex, which generates an aspiration of the granular material in the direction of the recipient. This makes it possible to avoid the implementation of complex means for fluidising the granular material.

This device also has the advantage of assuring a reproducibility of the filling, which may be very important when handling recipients of large size, and of course in the case where a very high reproducibility of filling is desired.

Figure 16:
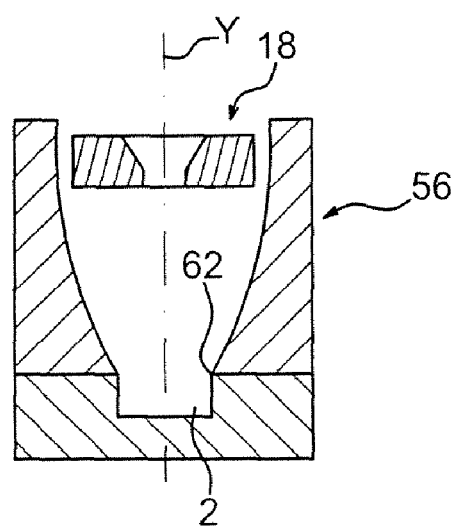
FIG. 16 is a sectional view of a distribution device according to the present invention associated with a concentration means.

Advantageously, particularly but not exclusively when the distribution device 10 is arranged above the recipient 2, as shown in FIG. 16 and not inside it, a concentrator means 56 shown in FIG. 15, is provided between the deflector means 18 and the recipient 2 so that the granular material 8 is concentrated to enter into the recipient 2. The concentrator enables the granular material to be conveyed into the recipient, in particular when the recipient has smaller dimensions than those of the distribution device. The concentrator means 56 comprise a lower end 62 having a shape corresponding to the shape of the upper end of the recipient to be filled.

A filling device according to the present invention comprises the feed hopper 6 and the distribution device 10 according to the present invention.

An example of filling method using the filling device according to the present invention will now be described.

The method comprises the principal steps:
putting in place the distribution device 10 and the hopper 6 opposite above the opening 4 of the recipient 2,
bringing into rotation the deflector means 18,
opening the hopper.

In a more detailed manner, the method comprises a prior step of putting in place the distribution device 10 opposite the opening 4 of the recipient 2.

A following step consists in selecting the speed of rotation of the deflector means 18 so as to adapt the filling to the section of the recipient. The speed of rotation may vary during the filling phase according to a pre-established sequence recorded in a memory of control means.

The deflector means are then brought into rotation according to the determined speed. Then the material(s) in granular form are conveyed by the hopper to the entrance of the distribution device.

The granules are immediately sent into the recipient. As a function of the speed of rotation of the deflector means 18, a more or less important part of the granules takes the passage 14, and another part is diverted by the deflector means 18.

The end of the filling is for example automatic when the load of granules contained in the hopper has flowed out completely.

One may provide to arrange the distribution device 10 entirely inside the recipient (FIG. 1*a* to 3*b*) when its size so allows.

The present invention may be used in numerous fields, for example in the agri-foodstuffs sector or in the pharmaceuticals industry, in the automobile industry, in the cement industry and in chemistry.

The invention claimed is:

1. A distribution device of at least one granular material, comprising:
  a central passage that extends vertically along a longitudinal axis of the distribution device; and
  a deflector configured to deflect a first portion of the material, the deflector being configured to rotate around the longitudinal axis of the distribution device, the deflector including at least one deflection surface that extends up to and directly contacts an outside edge, in a direction perpendicular to the longitudinal axis of the distribution device, of an entrance to the central passage so that a second portion of the material that is not diverted by the deflector takes the central passage, the deflection surface being inclined in a direction of the the longitudinal axis of the distribution device in a general direction of flow of the material, the deflector being located vertically above the central passage with respect to the general direction of flow of the material.

2. A distribution device according to claim 1, wherein the distribution device is configured to be interposed between a feed source of the granular material and a recipient to be filled.

3. A distribution device according to claim 1, wherein the central passage and the deflector are configured such that the first portion of the material that is diverted and second portion of the material that is not diverted take the passage depending on a speed of rotation of the deflector.

4. A distribution device according to claim 1, wherein the deflector surrounds in a continuous manner an end of the entrance of the passage.

5. A distribution device according to claim 4, wherein the deflection surface is a cone, generatrixes of which are straight lines.

6. A distribution device according to claim 5, wherein the deflector surrounds in a continuous manner an end of the entrance of the passage and a section of the deflection surface along a plane orthogonal to the axis is a circle.

7. A distribution device according to claim 5, wherein the deflector surrounds in a continuous manner an end of the entrance of the passage and a section of the deflection surface along a plane orthogonal to the axis is an ellipse.

8. A distribution device according to claim 5, wherein the deflector surrounds in a continuous manner an end of the entrance of the passage and a section of the deflection surface along a plane orthogonal to the axis is substantially of rectangular shape.

9. A distribution device according to claim 1, wherein the deflection surface is concave.

10. A distribution device according to claim 1, wherein the deflection surface is convex.

11. A distribution device according to claim 1, wherein the passage has a shape of a regular cylinder.

12. A distribution device according to claim 1, wherein the passage is of substantially conical shape oriented towards the deflector.

13. A distribution device according to claim 1, wherein the passage has a shape of an ellipsoidal guiding cylinder.

14. A distribution device according to claim 1, further comprising a central shaft coaxial to the axis of rotation connected to the deflector by at least one arm.

15. A distribution device according to claim 1, further comprising a central shaft coaxial to the axis of rotation connected to the deflector by at least one blade.

16. A distribution device according to the claim 15, wherein the blade is contained in a plane containing the axis.

17. A distribution device according to claim 15, wherein inner and outer sides of the blade, connecting the blade respectively to the shaft and to the deflector, are inclined in relation to the axis of rotation.

18. A distribution device according to claim 1, wherein the deflection surface comprises apertures, placing in communication an inner space delimited by the deflection surface with an outer environment.

19. A distribution device according to the claim 18, wherein the apertures are substantially parallel to the axis of rotation and are distributed out in a regular manner angularly around the axis of rotation.

20. A distribution device according to claim 18, wherein the apertures extend over all a height of the distribution device along the axis of rotation.

21. A distribution device according to claim 18, wherein the apertures extend over a part only of a height of the distribution device.

22. A device for filling recipients with at least one granular material comprising:
a feed hopper; and
a distribution device of at least one granular material, including
a central passage that extends vertically along a longitudinal axis of the distribution device; and
a deflector configured to deflect a first portion of the material, the deflector being configured to rotate around the longitudinal axis of the distribution device, the deflector including at least one deflection surface that extends up to and directly contacts an outside edge, in a direction perpendicular to the longitudinal axis of the distribution device, of an entrance to the central passage so that a second portion of the material that is not diverted by the deflector takes the central passage, the deflection surface being inclined in a direction of the longitudinal axis of the distribution device in a general direction of flow of the material, the deflector being located vertically above the central passage with respect to the general direction of flow of the material,
the distribution device being interposed between the feed hopper and a recipient to be filled.

23. A method of filling a recipient by a granular material with a device for filling recipients with at least one granular material including a feed hopper and a distribution device of at least one granular material, including a central passage that extends vertically along a longitudinal axis of the distribution device, and a deflector configured to deflect a first portion of the material, the deflector being configured to rotate around the longitudinal axis of the distribution device, the deflector including at least one deflection surface that extends up to and directly contacts an outside edge, in a direction perpendicular to the longitudinal axis of the distribution device, of an entrance to the central passage so that a second portion of the material that is not diverted by the deflector takes the central passage, the deflection surface being inclined in a direction of the longitudinal axis of the distribution device in a general direction of flow of the material, the deflector being located vertically above the central passage with respect to the general direction of flow of the material, the distribution device being interposed between the feed hopper and a recipient to be filled, the method comprising:
putting in place the distribution device and the hopper opposite an opening of the recipient;
bringing into rotation the deflector according to a speed; and
feeding at least one granular material by opening the hopper.

24. A filling method according to claim 23, wherein during the filling the speed of rotation is variable according to a predetermined sequence.

25. A filling method according to claim 24, wherein the distribution device is arranged inside the recipient.

* * * * *